(12) United States Patent
Krüger

(10) Patent No.: US 7,764,375 B2
(45) Date of Patent: Jul. 27, 2010

(54) IMAGING DEVICE FOR IMAGING MICROSCOPIC OR MACROSCOPIC OBJECTS

(75) Inventor: Ralf Krüger, Butzbach/Griedel (DE)

(73) Assignee: Leica Microsystems CMS GmbH, Wetzler (DE)

(*) Notice: Subject to any disclaimer, the term of this patent is extended or adjusted under 35 U.S.C. 154(b) by 423 days.

(21) Appl. No.: 11/733,436

(22) Filed: Apr. 10, 2007

(65) Prior Publication Data
US 2007/0236788 A1   Oct. 11, 2007

(30) Foreign Application Priority Data
Apr. 11, 2006   (DE) ................ 10 2006 017 350

(51) Int. Cl.
  *G01J 4/00* (2006.01)
  *G02B 21/00* (2006.01)
(52) U.S. Cl. .............. 356/364; 356/369; 359/371; 359/386
(58) Field of Classification Search .......... 356/364–369; 359/371, 386; 250/225
  See application file for complete search history.

(56) References Cited

U.S. PATENT DOCUMENTS 5,638,207 A   6/1997 Fukuzawa et al.
7,292,389 B2 * 11/2007 Kaminsky et al. .......... 359/371
2003/0007149 A1   1/2003 Yamamoto et al.

\* cited by examiner

*Primary Examiner*—L. G Lauchman
(74) *Attorney, Agent, or Firm*—Foley & Lardner LLP

(57) ABSTRACT

The present invention relates to an imaging device (1) for imaging microscopic or macroscopic objects (5). The imaging device (1) comprises a light source (2), an illumination beam path (6), an imaging beam path (7) and an imaging optical means (4), in particular in the form of an objective. The illumination beam path (6) extends from the light source (2) to the object (5). The imaging beam path (7) extends from the object (5) to a detector or a tube (3). At least one polarization means (9) is provided in the illumination beam path (6), which polarization means (9) can be used to convert the light of the light source to a prescribable polarization state. An analyzer means (10) is provided in the imaging beam path (7), with the analyzer means (10) and the polarization means (9) being able to be adjusted in relation to one another in such a manner that the light entering the imaging beam path (7) cannot pass through the analyzer means (10). An adjustable optical component (11) is provided in the beam path between the polarization means (9) and the analyzer means (10) for largely suppressing undesired reflections at optical components (4) in the beam path of the imaging device (1), which optical component can be used to either largely depolarize the polarized light serving for the object illumination or to split it into partial beams, depending on its adjustment.

36 Claims, 3 Drawing Sheets

IMAGING DEVICE FOR IMAGING MICROSCOPIC OR MACROSCOPIC OBJECTS

CROSS-REFERENCE TO RELATED PATENT APPLICATIONS

The right of foreign priority is claimed under 35 U.S.C. §119(a) based on Federal Republic of Germany Application No. 10 2006 017 350.3, filed Apr. 11, 2006, the entire contents of which, including the specification, drawings, claims and abstract, are incorporated herein by reference.

BACKGROUND OF THE INVENTION

The present invention relates to an imaging device for imaging microscopic or macroscopic objects. The imaging device comprises a light source, an illumination beam path, an imaging beam path and an imaging optical means, in particular in the form of an objective. The illumination beam path extends from the light source to the object. The imaging beam path extends from the object to a detector or a tube. At least one polarization means is provided in the illumination beam path, which polarization means can be used to convert the light of the light source to a prescribable polarization state. An analyzer means is provided in the imaging beam path, with the analyzer means and the polarization means being able to be adjusted in relation to one another in such a manner that the light entering the imaging beam path cannot pass through the analyzer means. In other words, the light propagating toward the detector or tube is basically completely extinguished. In the case of linearly polarized light, the polarization direction of the analyzer means can be adjusted such that the light polarized by the polarization means, if it were to traverse the illumination and imaging beam paths toward the analyzer means, is oriented in its polarization direction at right angles to the polarization direction of the analyzer means (intersecting orientation of the polarizers). The present invention also relates to a retrofit kit for a conventional macroscope or for a conventional microscope.

Imaging devices for imaging microscopic or macroscopic objects have long been known from the prior art. To be specific, it is, on the one hand, usually a microscope if microscopic objects are to be examined or imaged. On the other hand, it is usually a macroscope if macroscopic objects are to be examined or imaged. Microscopes with a differential interference contrast (DIC) in particular have not only a linear or circular polarizer and a corresponding analyzer, but also a Wollaston prism.

Macroscopes, in particular, have an imaging optical means of smaller magnification, for example 0.5× to 4×. First-order reflections strongly disturb the imaging in brightfield applications in the case of coaxial reflected-light illumination with weakly magnifying objectives. These first-order reflections mainly occur at surfaces of optical components which are arranged both in the illumination and also in the imaging beam path. The reflection of the illumination light at an interface of the imaging optical means facing the light source should thus be mentioned in particular, to be precise at air/glass and also at glass/air interface transitions which produce the disturbing effect primarily in the brightfield application into the imaging beam path and thus to a detector and/or to the tube or to the eye of the user.

SUMMARY OF THE INVENTION

The present invention is therefore based on the object of indicating and developing an imaging device of the type mentioned in the introduction, in which, in brightfield applications, the undesired reflections are largely suppressed and which has a DIC imaging mode. The present invention is furthermore based on the object of providing a retrofit kit for a conventional macroscope or for a conventional microscope which can be used to largely suppress undesired reflections.

The imaging device, according to the invention, of the type mentioned in the introduction achieves the abovementioned object by means of the features described herein. According to this, an imaging device of this type is characterized by the fact that an adjustable optical component is provided in the illumination beam path and/or in the imaging beam path between the polarization means and the analyzer means, which optical component can be used to either largely depolarize the polarized light serving for the object illumination or to split it into partial beams, depending on its adjustment.

Thus it has first been recognized that an abovementioned reflection in the imaging beam path or upstream of the detector/tube can be at least effectively suppressed, or in the ideal case completely masked out, if a respective polarization means and analyzer means are provided at suitable locations in the beam path of the imaging device (i.e. in the illumination beam path and/or in the imaging beam path). Thus a linear polarization filter could be provided by way of example between the light source and the first optical component (e.g. a lens) of the illumination beam path, which polarization filter converts the unpolarized light of the light source to linearly polarized light of a prescribable polarization direction. Now the linearly polarized light also produces reflections at optical components provided in the illumination or imaging beam path. First-order reflections, which occur between beam splitter and object, have a particularly disturbing effect, since they enter the imaging beam path directly and are thus superimposed on the image. These reflections can, however, be suppressed, or filtered out, using an analyzer arranged upstream of the detector or tube, that likewise means a linear polarization filter, if the polarization direction of the analyzer is oriented at right angles to the polarization direction of the illumination light or to the light propagating in the imaging beam path toward the detector or tube, or in other words, if the oscillation direction of the polarizer and that of the analyzer intersect. In this arrangement, however, the object to be examined would likewise be illuminated with linearly polarized light and if the object has no birefringent characteristics or any other characteristics changing the polarization of the illumination light, the object would be hardly perceptible in the case of reflected-light operation of the imaging device, since the light reflected at the object also could not pass through the analyzer means on account of the intersecting adjustment.

An adjustable optical component is therefore provided in a manner according to the invention and is arranged in the beam path and can be used to largely depolarize the polarized light of the light source serving for the object illumination—polarized by the polarization means—in one of its possible adjustment positions or in an operating state of the optical component, depending on its adjustment. In this respect, the object is illuminated with unpolarized light and, accordingly, unpolarized light, proceeding from the object, enters the imaging beam path which can also pass through the analyzer means since this light is depolarized and consequently has an oscillation portion substantially corresponding to the polarization direction of the analyzer means. It should also be noted that both in microscopy and in macroscopy glass plates are usually used as object slides. A brightfield application can be achieved when the optical component is adjusted in this manner. In another adjustment of the optical component, the optical component splits the light into partial beams, which makes a DIC application possible.

In a very particularly preferred embodiment of an imaging device according to the invention, the optical component is arranged between the imaging optical means and the object. Thus, the optical component is arranged in the beam path of the imaging device, to be precise in the illumination beam path. In this respect, the light serving for the object illumination in particular is depolarized. The illumination light has a linear or circular polarization between the polarization means and the imaging optical means.

In terms of construction, the optical component could be received in a sleeve-type holder which can be adapted on the object side to the imaging optical means or to the objective. This adaptation is preferably such that it can be reversed, so that the optical component can be removed from the beam path and thus merely the polarization means and the analyzer means remain in the imaging device. Furthermore, the polarization means and the analyzer means—e.g. in each case arranged in a filter tray—could also be removed from the imaging device, with the result that the imaging device can be converted to a completely conventional microscope or macroscope.

The polarization means could be arranged in the illumination beam path between the light source and the imaging optical means. The polarization means preferably has a linear or circular polarization filter. A circular polarization filter comprises a linear polarizer, downstream of which a λ/4-plate is arranged. The light passing through the linear polarizer is linearly polarized by the linear polarizer and the linearly polarized light is converted to circularly polarized light by the λ/4-plate.

The analyzer means could be arranged in the imaging beam path between the imaging optical means and a detector and/or a tube and could likewise have a linear or circular polarization filter. The circular polarization filter in the analyzer means comprises a λ/4-plate, downstream of which a linear polarizer is arranged. The λ/4-plate is used to convert the circularly polarized light to linearly polarized light. Only light having an oscillation portion oriented parallel to the linear polarization direction of the linear polarizer can pass through the linear polarizer.

Basically, all optical components which convert linearly or circularly polarized light to unpolarized light could now be used as optical component. The optical component very particularly preferably comprises at least two plates of birefringent material of substantially equal thickness. A plate of this type could for example have a uniaxially birefringent crystal.

The two plates of the optical component are such that the crystal-optical axis does not run parallel to the surface of the plate. On passing through, the light thereby experiences not only a path difference of the ordinary and the extraordinary component but also angle splitting inside the plate or a lateral offset behind the plane-parallel plate. If the two plates are aligned such that the lateral offset behind the plates is compensated for, a path difference between the ordinary and the extraordinary partial beam remains as the effect.

By itself, this would not yet lead to a depolarization if light of just one wavelength is used. A conventional light source of a microscope or a macroscope, however, produces white light, that is to say light of several wavelength portions of the visual spectrum. Spatial splitting and its compensation thus take place by means of the two plates of the optical component for each wavelength portion of the illumination light, so that it leads to an intermixing of different polarization states, which corresponds to a depolarization effect. This effect can be achieved particularly advantageously if the plates have a thickness of greater than or equal to 1 mm. The first plate can be arranged somewhat at a distance from the second plate. If the optical component is adjusted in this manner, the resulting optical arrangement corresponds to an application similar to a brightfield application in the coaxial reflected light.

On the other hand, in another adjustment of the optical component, the two plates could be aligned with respect to one another such that, as the light coming from the light source passes through the first plate, a first lateral splitting of the light occurs and that, as the split light passes through the second plate, another lateral splitting possibly occurs. To be more specific, two plates could be provided which are aligned with respect to one another such that they can achieve a—preferably only one—total split which comprises two individual splits, with one plate effecting a first individual split and the second plate effecting a second individual split. A light beam thus passes through the first plate in an ordinary/extraordinary order and the second plate in an extraordinary/ordinary order. On account of the substantially identical axial position and thickness of the plates, no path difference between the two partial beams is produced. This contrast method corresponds to the classic DIC method in reflected light, wherein linearly polarized light is split into two partial beams which are polarized orthogonally to each other, illuminate the object in a laterally offset fashion and are recombined after a reflection at the object by the prism arrangement and are brought onto a common oscillation plane by the analyzer and consequently interfere. At least in this embodiment variant, the adjustment of the polarization direction of the polarization means and/or the polarization direction of the analyzer means can achieve a contrasting which can be achieved, in a comparable manner, by a de Sénarmont compensator arrangement. Another possibility of influencing the phase angle of the partial beams and thus of varying the contrast is to tilt one of the plates. The contrast can thereby be matched to the object or, optionally, the observation habits of the viewer.

The optical component could, on the one hand, now be adjusted by arranging the two plates of the optical component such that they can be rotated with respect to one another. This could be done manually or by means of a motor, for example, a suitable holder for this purpose being provided. On the other hand, the entire optical component could be arranged such that it can rotate in the beam path, which could also effect adjustability of the optical component.

In very general terms, the optical component could be adjustable such that any desired intermediate state can be adopted between two adjustments—the polarized light is depolarized or the polarized light is split into partial beams. This makes it possible to also generate intermediate states in which, on the one hand, disturbing first-order reflections from the imaging beam path can be largely suppressed and, on the other hand, contrasting of the image can be achieved which is similar or approximates to the DIC method. The optical component could ultimately be adjusted such that optimized object imaging can be thereby achieved.

As indicated above, the formation of the optical beam path of the imaging device according to the invention could be applied to a conventional macroscope or to conventional microscope, to be more precise for example by arranging the optical component between the imaging optical means and the object, arranging the polarization means in the illumination beam path between the light source and the imaging optical means and arranging the analyzer means in the imaging beam path between the imaging optical means and a detector or a tube.

In a very particularly preferred manner, the imaging device according to the invention has an—in particular coaxial—reflected-light illumination beam path and/or a brightfield illumination of the object. In other words, the object is illuminated from one direction and the object is imaged in the opposite direction. Consequently, the imaging optical means is used to both illuminate and image the object.

As indicated above, the disturbing reflections are noticeable in an objective or an imaging optical means of small numerical aperture and/or in the case of low magnification. The procedure according to the invention is therefore preferably used in an imaging optical means of this type. A low magnification is in particular understood to be a magnification of 0.5× to 4×, in some cases up to 10×.

In a preferred embodiment variant, at least one means could be provided which can be used to achieve a contrasting comparable to the de Sénarmont arrangement. This means could have a rotating apparatus, for example, which can be used to rotate the polarization means and/or the analyzer means and/or the optical component. The respective component could thus be arranged in holders which can be rotated accordingly, i.e. manually or by a motor.

With regard to a retrofit kit for a macroscope or for a microscope, the object mentioned in the introduction is achieved by the features described herein. Accordingly, a retrofit kit comprises a polarization means, an analyzer means and an optical component. Polarization means, analyzer means and optical component are introduced into the beam path of the microscope or macroscope such that thereby an imaging device can be formed. A retrofit kit of this type can be used in a very particularly advantageous manner to convert a conventional macroscope or microscope to an imaging device according to the invention, to be precise even if the respective appliance has already been in use at the end user's premises for a long time. One prerequisite for this is, however, that the respective appliance has corresponding fitting or insertion means into which the respective components can be introduced into the beam path, with the respective components (polarization means, analyzer means and optical component) being arranged in corresponding compatible holders or in components formed complementarily to the fitting or insertion means.

In summary, it should be emphasized that the imaging device according to the invention has a design which is comparable, at least with respect to the polarization means and analyzer means, to the differential interference contrast (DIC) design. The Wollaston prism which is usually provided therein is not necessary. The adjustable optical component is provided instead. In a very particularly advantageous manner, a differential interference contrast method or a design suitable therefor can thus be provided in one imaging mode in the form of the imaging device according to the invention even for objectives of weak magnification. In another imaging mode, a brightfield imaging can be achieved, where disturbing reflections can be advantageously suppressed. The adjustment of the adjustable optical component makes it possible to switch back and forth or over between the two imaging modes.

There are various possibilities of designing and developing the teaching of the present invention in an advantageous manner. Generally, preferred refinements and developments of the teaching are also explained in conjunction with the explanation of the preferred exemplary embodiments of the invention with reference to the drawing.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
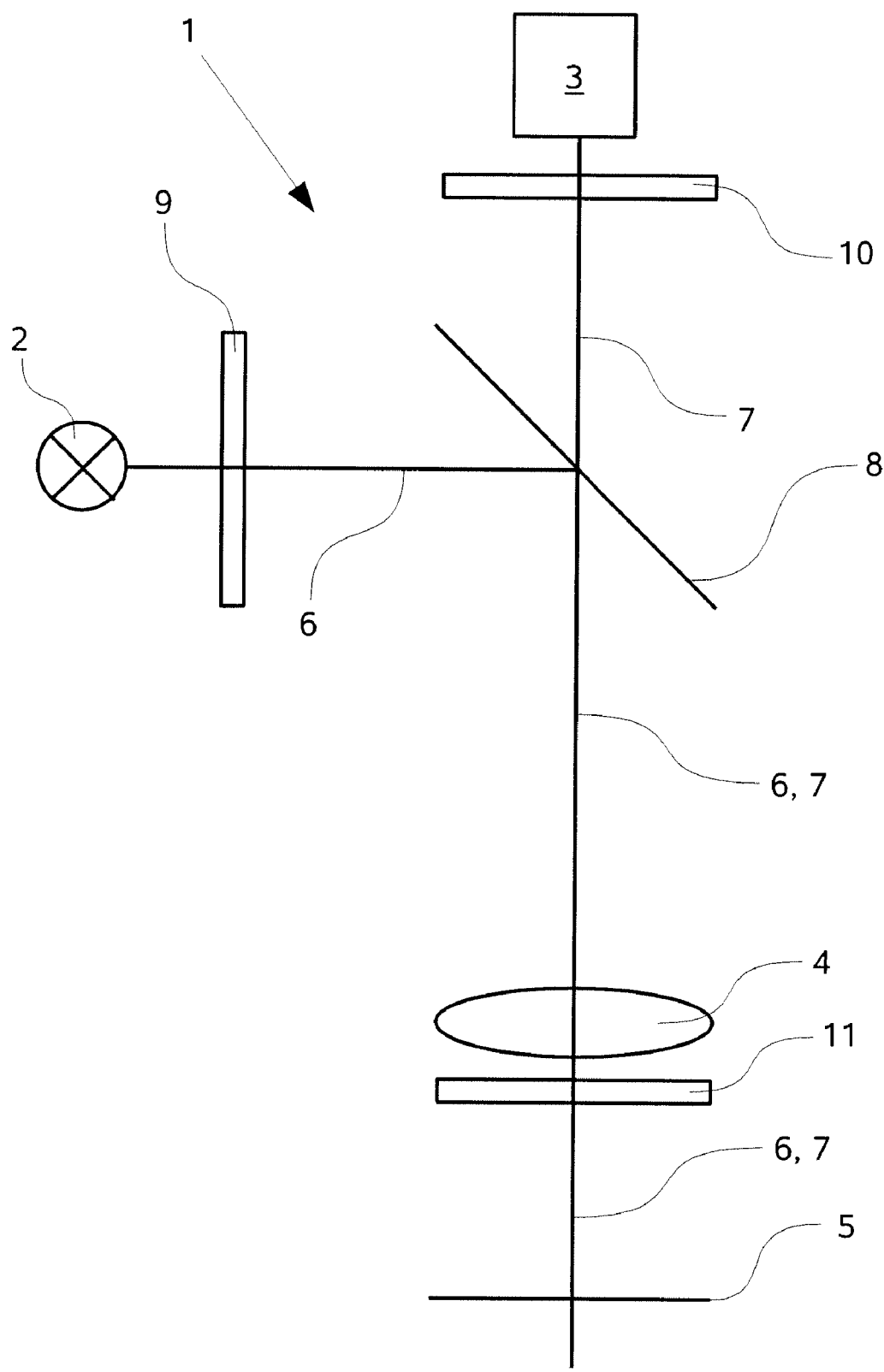
FIG. 1 shows a schematic illustration of an exemplary embodiment of an imaging device according to the invention.

Identical or similar components are denoted by the same reference symbols in the figures. FIG. 1 shows an exemplary embodiment of an imaging device 1 according to the invention. The imaging device 1 comprises a light source 2 (e.g. a conventional white light source) and a (schematically depicted) detector or a tube lens 3. In the case of a macroscope, the imaged object is observed through the schematically depicted tube lens 3, such that, strictly speaking, the imaging beam path extends right into the user's eye.

The imaging device 1 furthermore comprises an imaging optical means 4. The reference symbol 5 denotes the object plane of the imaging device 1, on which the object (usually on an object slide or specimen stage) is positioned. For reasons of simplicity, the reference symbol 5 is also used below to denote the object to be imaged. Thus, the illumination beam path 6 extends from the light source 2 up to the object 5. The imaging beam path 7 extends from the object 5 up to the tube lens 3 or up to the user's eye (not shown in FIG. 1). The light or illumination light of the light source 2 is reflected at the beam splitter 8 in the direction of the imaging optical means 4 and of the object 5. The illumination light reflected at the object 5 is at least partially imaged by the imaging optical means 4 in the direction of the tube lens 3 and in the process passes at least for the most part through the beam splitter 8, which has a suitable transmission or reflection ratio. For example, the surface of the beam splitter 8 facing the light source could have a reflection coefficient of 0.4, so that only 40 percent of the light of the light source is reflected by the beam splitter 8 in the direction of the object 5. Likewise 40% of the light reflected at the object 5 is then reflected in the direction of the light source, with the remaining portion of ca. 60 percent of the light reflected by the object, however, being able to pass through the beam splitter 8 in the direction of the detector or tube lens 3. The exemplary embodiment according to FIG. 1 accordingly involves a reflected-light illumination beam path, wherein both the illumination and the imaging beam paths 6 and 7 extend between the object 5 and the beam splitter 8.

The polarization means 9 is arranged in the illumination beam path 6 and between the light source 2 and the beam splitter 8, which polarization means 9 is used to bring the light of the light source 2 into a prescribable polarization state. The analyzer means 10 is arranged in the imaging beam path 7 and between the beam splitter 8 and the tube lens 3. The analyzer means 10 is, like the polarization means 9, likewise a linear polarization filter, with the polarization means 9 being arranged in relation to the analyzer means 10 such that their polarization directions are oriented substantially at right angles to one another (intersecting orientation).

In accordance with the invention, the adjustable optical component 11 is arranged between the imaging optical means 4 and the object 5. The optical component 11 can be used to largely depolarize the light of the light source 2 linearly polarized by the polarization means 9, such that the object 5 is illuminated by depolarized light.

Figure 2:
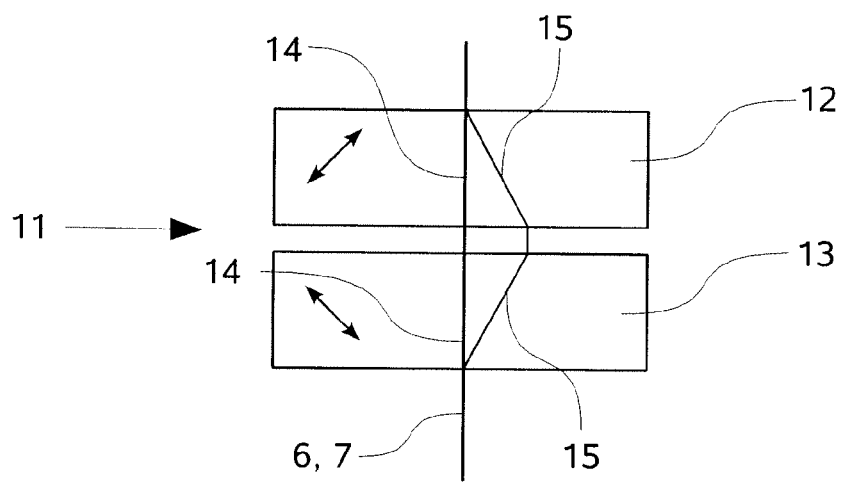
FIG. 2 shows a schematic illustration of an exemplary embodiment of an optical component.

FIG. 2 illustrates the method of operation as optical component 11 acting in a depolarizing manner. The optical component 11 shown in FIG. 2 has two plates 12, 13 which are arranged substantially parallel to one another and are of equal thickness. Both plate 12 and plate 13 are composed of identical optical material, to be more precise of a birefringent uniaxial crystal. The crystal-optical axes of both plates 12, 13 are indicated accordingly by the double-headed arrows. The crystal-optical axis of the plate 12 is aligned such that a light beam entering the plate 12 from above is split into two partial beams 14, 15, to be more specific into the ordinary partial beam 14 and the extraordinary partial beam 15. This is an angle splitting, since the two partial beams 14, 15 pass through the plate 12 at different angles. The partial beams 14, 15 exiting the plate 12 and entering the plate 13 are recombined on account of the correspondingly differently oriented crystal-optical axis of the plate 13, with the result that the angle splitting of the two partial beams 14, 15 is compensated for, or reversed, by the plate 13. The spatially recombined partial beams 14, 15 hereby have a path difference with respect to one another. FIG. 2 merely shows one light beam of one specific wavelength. Since the light of the light source 2, however, has several wavelength portions of the visible spectrum, the path of light of each wavelength differs somewhat, such that, overall, taking into account all the wavelength portions of the illumination light, an intermixing of a wide variety of polarization states occurs, which is equivalent to a depolarization effect.

Figure 3:
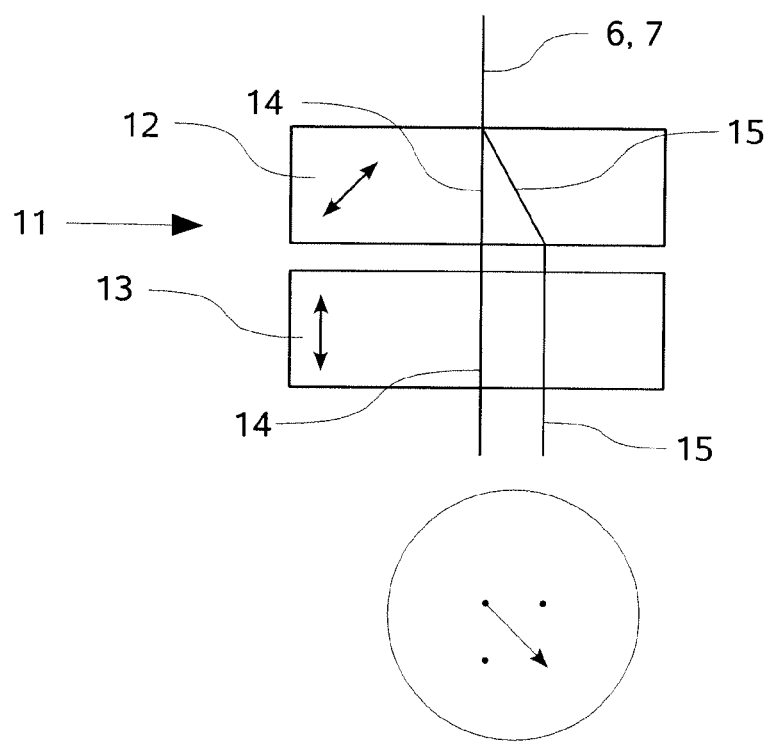
FIG. 3 shows a schematic illustration of the optical component from FIG. 2 in another operating state.

FIG. 3 shows the optical component 11 from FIG. 2 in another adjustment or in another mode of operation. The optical component 11 shown in FIG. 3 has—just as the optical component 11 shown in FIG. 2—two plates 12, 13 which are arranged substantially parallel to one another. Both plate 12 and plate 13 are composed of identical birefringent uniaxial optical material. The crystal-optical axes of both plates 12, 13 are indicated accordingly by the double-headed arrows. Contrary to FIG. 2, plate 13 is rotated by 90° with respect to the optical axis. The crystal-optical axis of plate 12 is aligned such that a light beam entering plate 13 from above is split into two partial beams 14, 15, to be more specific into the ordinary partial beam 14 and the extraordinary partial beam 15. The crystal-optical axis of plate 13 is now aligned in this adjustment such that the two partial beams 14, 15 are not recombined as in the exemplary embodiment according to FIG. 2, rather a spatial split is maintained. On account of the axial position of the two plates 12, 13 and their identical thickness, the two partial beams do not have a path difference after passing through the two plates 12, 13, but a lateral offset with respect to one another.

The circle shown under the two plates 12, 13 in FIG. 3 schematically shows a cross-sectional area of the illumination beam path 6 at a location between the optical component 11 and the object 5. The three points shown denote in each case an individual split achieved by plates 12, 13. The end of the arrow in the circle indicates the resulting split of the one partial beam which can be achieved based on the arrangement of the two plates. Thus the one light beam of the illumination beam path 6 entering the plate 12 from above is split into two partial beams passing through the second plate, to be more specific in each case at the end of the arrow in the circle of FIG. 3. The beam splitting is chosen in such a way, however, that its magnitude lies below the lateral resolution capability of the imaging device or of the imaging optical means 4 such that no visible double image results. An arrangement of this type, in conjunction with a contrast adjustment according to the Sénarmont method, corresponds to the differential interference contrast method in microscopy. A contrast adjustment can be achieved, for example, by rotating the polarization means 9 and/or the analyzer means 10 and/or the optical component 11, or the plate 12 and/or 13.

Figure 4:
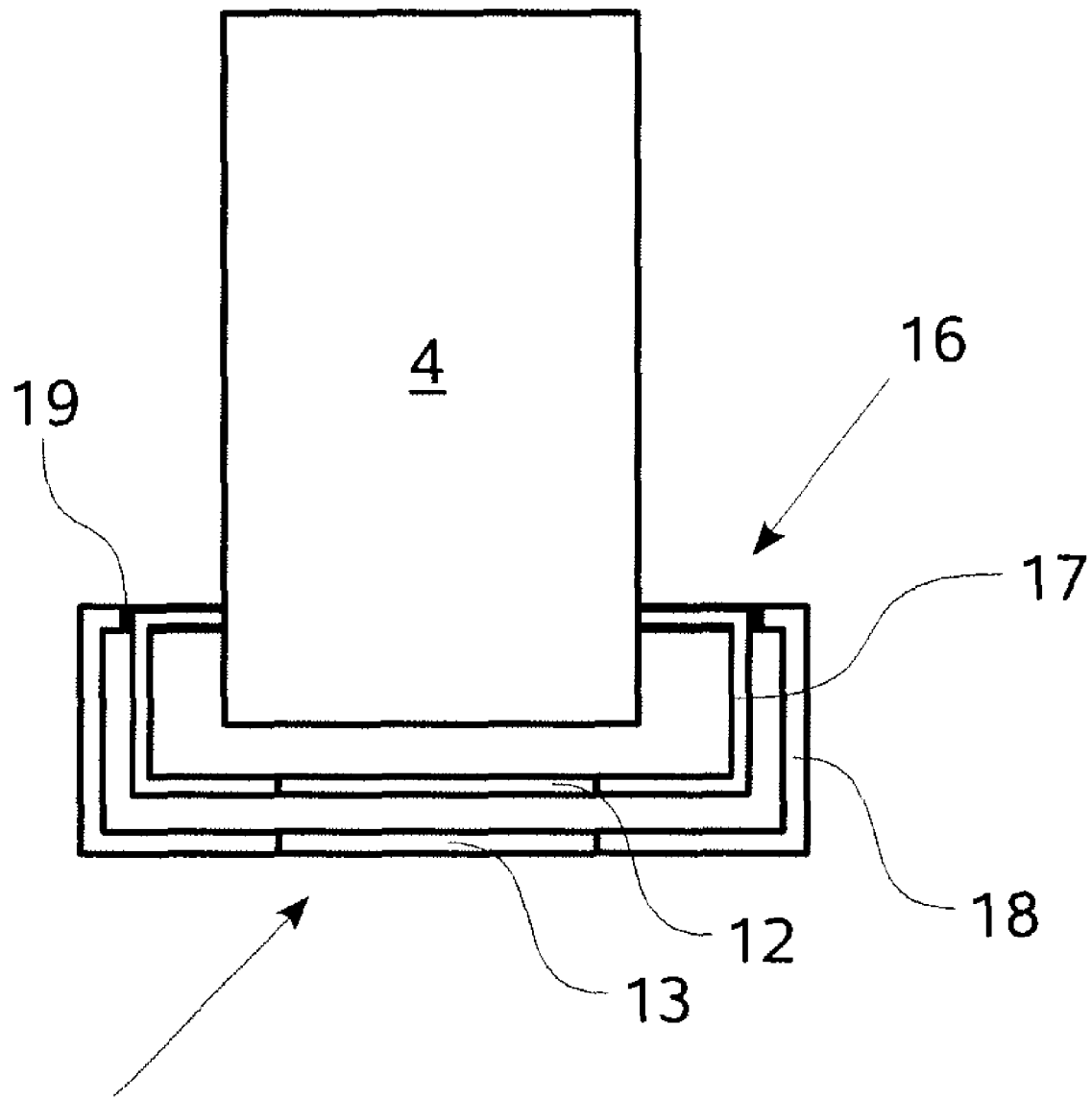
FIG. 4 shows a schematic illustration of an exemplary embodiment, in which one possible way of adapting the optical component to the imaging optical means is shown.

FIG. 4 shows, indicated only schematically in an exemplary embodiment, how the optical component 11 from FIGS. 2 and 3 is adapted to the imaging optical means 4. This is achieved such that the optical component 11 is arranged in a sleeve-type component 16. The component 16 can be adapted to the imaging optical means 4 in a reversible manner, for example by fixedly clamping it on the housing of the imaging optical means 4 or providing it with a locking means which is formed in a manner comparable to a bayonet lock or is similar to it. The component 16 can hereby be used to simply and quickly fit or remove the optical component 11. Since the imaging optical means 4 has a large working distance, typically of the order of magnitude of 60 mm, there is sufficient space for it. The internal part 17 of the component 16 is arranged here on the imaging optical means 4 in a rotationally fixed manner. The external part 18 of the component 16 can be rotated with respect to the imaging optical means 4 and the internal part 17, which is possible with the aid of the schematically shown bearing 19. The internal part 17 holds the plate 12 and the external part 18 holds the plate 13. Rotating the external part 18 in relation to the imaging optical means 4 and to the internal part 17 allows switching of the adjustable optical component 11 between the operating states shown in FIG. 2 and in FIG. 3.

Finally, it is pointed out most particularly that the exemplary embodiments explained above merely serve to describe the claimed teaching, but do not restrict the latter to the exemplary embodiments.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

LIST OF REFERENCE SYMBOLS

1 Imaging device
2 Light source
3 Tube lens
4 Imaging optical means
5 Object plane or object 6 Illumination beam path
7 Imaging beam path
8 Beam splitter
9 Polarization means
10 Analyzer means
11 Optical component
12 First plate of (11) from FIGS. 2 and 3
13 Second plate of (11) from FIGS. 2 and 3
14 Ordinary partial beam
15 Extraordinary partial beam
16 Sleeve-type component with (11)
17 Internal part of (16)
18 External part of (16)
19 Bearing between (17) and (18)

What is claimed is:

1. A microscope for imaging microscopic objects, comprising:
   a light source,
   an illumination beam path,
   an imaging beam path,
   an imaging optical device,
   wherein the illumination beam path extends from the light source to an object, wherein the imaging beam path extends from the object to a detector or a tube,
   wherein at least one polarization device is provided in the illumination beam path, wherein the polarization device is configured to convert light of the light source to a prescribable polarization state,
   an analyzer device provided in the imaging beam path, wherein the analyzer device and the polarization device are configured to be adjusted in relation to one another in such a manner that light entering the imaging beam path cannot pass through the analyzer device, and
   an adjustable optical component provided in at least one of the beam paths between the polarization device and the analyzer device,
   wherein the adjustable optical component is configured to substantially depolarize the light in the predetermined polarization state and serving to illuminate the object or to split the light in the predetermined polarization state into partial beams, depending on an adjustment of the adjustable optical component.

2. The microscope as claimed in claim 1, wherein the adjustable optical component is arranged between the imaging optical device and the object and wherein the adjustable optical component is received in a sleeve-type holder which is configured to be adapted on an object side to the imaging optical device such that the sleeve-type holder is reversible.

3. The microscope as claimed in claim 1, wherein the polarization device is arranged in the illumination beam path between the light source and the imaging optical device and has a linear or circular polarization filter.

4. The microscope as claimed in claim 1, wherein the analyzer device is arranged in the imaging beam path between the imaging optical device and the detector and/or tube and has a linear or circular polarization filter.

5. The microscope as claimed in claim 1, wherein the adjustable optical component comprises at least two plates of birefringent material and wherein the two plates substantially are of equal thickness.

6. The microscope as claimed in claim 5, wherein the adjustable optical component is adjustable such that the at least two plates of the adjustable optical component are aligned with respect to one another such that an optical axis of one plate is oriented substantially at right angles with respect to an optical axis of another plate.

7. The microscope as claimed in claim 5, wherein the adjustable optical component is adjustable such that the at least two plates of the adjustable optical component are aligned with respect to one another such that, as the light coming from the light source passes through a first plate, a splitting of the light occurs and that, as the split light passes through a second plate, the splitting is substantially reversed, wherein the splitting is an angle splitting or a lateral splitting.

8. The microscope as claimed in claim 5, wherein the adjustable optical component is configured to be adjusted such that the at least two plates are aligned with respect to one another such that, as the light coming from the light source passes through a first plate, a first splitting of the light occurs and that, as the split light passes through a second plate, another splitting occurs, wherein the another splitting is an angle splitting or a lateral splitting.

9. The microscope as claimed in claim 5, wherein the at least two plates of the adjustable optical component are arranged such that the at least two plates are rotable and/or tilted with respect to one another in a manner operable manually or by a motor.

10. The microscope as claimed in claim 1, wherein the adjustable optical component is configured to be adjusted such that any desired intermediate state is configured to be adopted between two adjustments to depolarize the light in the predetermined polarization state and to split the light in the predetermined polarization state into the partial beams.

11. The microscope as claimed in claim 1, wherein the microscope includes a reflected-light illumination beam path and/or brightfield illumination of the object.

12. The microscope as claimed in claim 1, wherein the microscope is configured for wide-field imaging.

13. The microscope as claimed in claim 1, wherein the imaging optical device has a small numerical aperture and/or a magnification, for example of 0.5× to 4×.

14. The microscope as claimed in claim 1, wherein at least one device is provided which is configured to be used to achieve a contrasting comparable to a de Sénarmont arrangement.

15. A retrofit kit for a microscope, comprising a polarization device, an analyzer device and an adjustable optical component, wherein the polarization device, analyzer device and the adjustable optical component are configured to be introduced into a beam path of the microscope such that a microscope as claimed in claim 1 is provided.

16. The microscope as claimed in claim 14, wherein the de Sénarmont arrangement is a rotating apparatus configured to rotate the polarization device and/or the analyzer device and/or the adjustable optical component.

17. The microscope as claimed in claim 1, wherein the imaging optical device is an objective.

18. The microscope as claimed in claim 1, wherein the adjustable optical component comprises at least two plates of uniaxially birefringent material.

19. A macroscope for imaging macroscopic objects, comprising:
   a light source,
   an illumination beam path,
   an imaging beam path,
   an imaging optical device,
   wherein the illumination beam path extends from the light source to an object, wherein the imaging beam path extends from the object to a detector or a tube,
   wherein at least one polarization device is provided in the illumination beam path, wherein the polarization device is configured to convert light of the light source to a prescribable polarization state, an analyzer device provided in the imaging beam path, wherein the analyzer device and the polarization device are configured to be adjusted in relation to one another in such a manner that light entering the imaging beam path cannot pass through the analyzer device, and an adjustable optical component provided in at least one of the beam paths between the polarization device and the analyzer device, wherein the adjustable optical component is configured to substantially depolarize the light in the predetermined polarization state and serving to illuminate the object or to split the light in the predetermined polarization state into partial beams, depending on an adjustment of the adjustable optical component.

20. The macroscope as claimed in claim 19, wherein the adjustable optical component is arranged between the imaging optical device and the object and wherein the adjustable optical component is received in a sleeve-type holder which is configured to be adapted on an object side to the imaging optical device such that the sleeve-type holder is reversible.

21. The macroscope as claimed in claim 19, wherein the polarization device is arranged in the illumination beam path between the light source and the imaging optical device and has a linear or circular polarization filter.

22. The macroscope as claimed in claim 19, wherein the analyzer device is arranged in the imaging beam path between the imaging optical device and the detector and/or the tube and has a linear or circular polarization filter.

23. The macroscope as claimed in claim 19, wherein the adjustable optical component comprises at least two plates of birefringent material and wherein the two plates substantially are of equal thickness.

24. The macroscope as claimed in claim 23, wherein the adjustable optical component is adjustable such that the at least two plates of the adjustable optical component are aligned with respect to one another such that an optical axis of one plate is oriented substantially at right angles with respect to an optical axis of another plate.

25. The macroscope as claimed in claim 23, wherein the adjustable optical component is adjustable such that the at least two plates of the adjustable optical component are aligned with respect to one another such that, as the light coming from the light source passes through a first plate, a splitting of the light occurs and that, as the split light passes through a second plate, the splitting is substantially reversed, wherein the splitting is an angle splitting or a lateral splitting.

26. The macroscope as claimed in claim 23, wherein the adjustable optical component is configured to be adjusted such that the at least two plates are aligned with respect to one another such that, as the light coming from the light source passes through a first plate, a first splitting of the light occurs and that, as the split light passes through a second plate, another splitting occurs, wherein the another splitting is an angle splitting or a lateral splitting.

27. The macroscope as claimed in claim 23, wherein the at least two plates of the adjustable optical component are arranged such that the at least two plates are rotable and/or tilted with respect to one another in a manner operable manually or by a motor.

28. The macroscope as claimed in claim 19, wherein the adjustable optical component is configured to be adjusted such that any desired intermediate state is configured to be adopted between two adjustments to depolarize the light in the predetermined polarization state and to split the light in the predetermined polarization state into the partial beams.

29. The macroscope as claimed in claim 19, wherein the macroscope includes a reflected-light illumination beam path and/or brightfield illumination of the object.

30. The macroscope as claimed in claim 19, wherein the macroscope is configured for wide-field imaging.

31. The macroscope as claimed in claim 19, wherein the imaging optical device has a small numerical aperture and/or a magnification of 0.5× to 4×.

32. The macroscope as claimed in claim 19, wherein at least one device is provided which is configured to be used to achieve a contrasting comparable to a de Sénarmont arrangement.

33. The macroscope as claimed in claim 32, wherein the de Sénarmont arrangement is a rotating apparatus configured to rotate the polarization device and/or the analyzer device and/or the adjustable optical component.

34. A retrofit kit for a macroscope, comprising a polarization device, an analyzer device and an adjustable optical component, wherein the polarization device, analyzer device and the adjustable optical component are configured to be introduced into a beam path of the macroscope such that thereby an imaging device as claimed in claim 19 is provided.

35. The macroscope as claimed in claim 19, wherein the imaging optical device is an objective.

36. The macroscope as claimed in claim 19, wherein the adjustable optical component comprises at least two plates of uniaxially birefringent material.

* * * * *